Patented Nov. 7, 1950

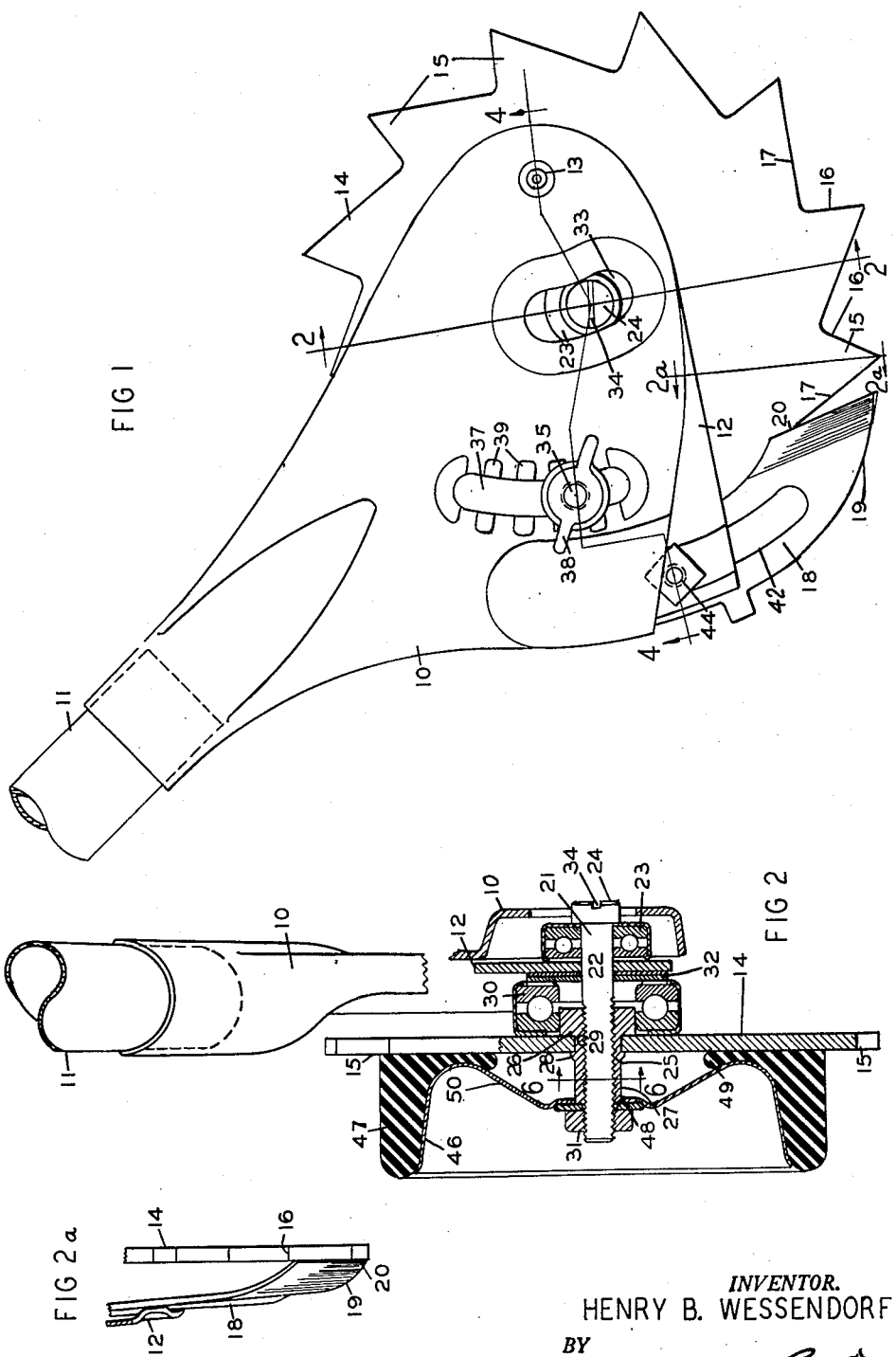

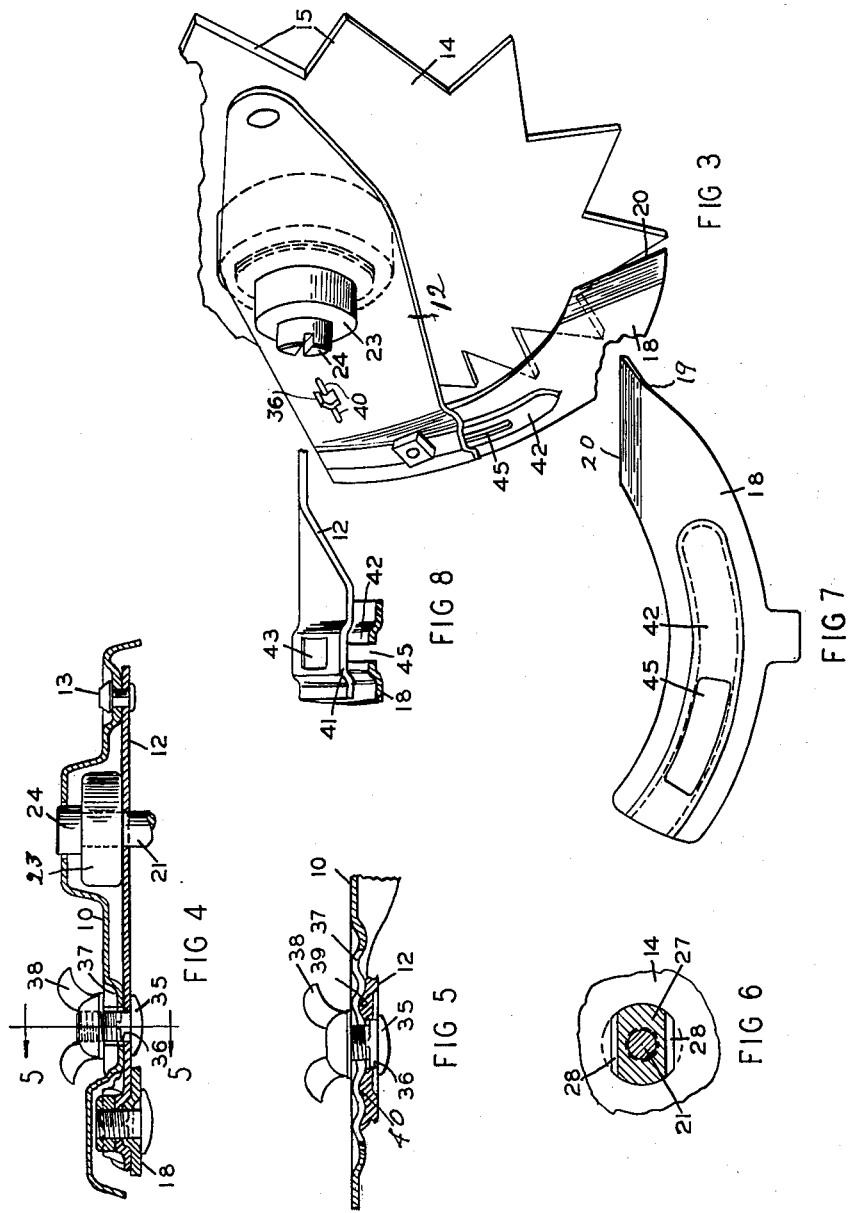

2,528,929

UNITED STATES PATENT OFFICE 2,528,929

LAWN TRIMMER

Henry B. Wessendorf, Dayton, Ohio

Application November 4, 1946, Serial No. 707,565

7 Claims. (Cl. 97—227)

This invention relates to a lawn trimmer, and one object of the invention is to provide a strong durable trimmer which is easily operated and will make a continuous cut flush with the ground.

A further object of the invention is to provide such a trimmer with a rotary cutting element having a strong cutting action which enables it to cut turf or grass or both.

A further object of the invention is to provide a rotary trimmer having a stationary cutting element which will lift the turf and grass to cutting position between the stationary and rotary cutting elements.

A further object of the invention is to provide a rotary trimmer in which the cutting elements are self-sharpening and are relatively adjustable to compensate for wear.

A further object of the invention is to provide a trimmer in which the cutting teeth of the rotary element are forced into the turf by the forward movement of the trimmer and positively rotate the rotary element.

A further object of the invention is to provide such a trimmer which will operate in a laterally tilted position to trim the grass along a wall or the like.

A further object of the invention is to provide such a trimmer having means for guiding the same along the edge of a walk and for rotating the rotary element when the teeth of the latter do not enter the ground far enough to impart to the rotary element the necessary rotative force, or when the trimmer is tilted laterally.

Other objects of the invention may appear as the trimmer is described in detail.

In the accompanying drawings Fig. 1 is a side elevation of a lawn trimmer embodying the invention; Fig. 2 is a section taken on the line 2—2 of Fig. 1; Fig. 2a is a section taken on line 2a—2a of Fig. 1; Fig. 3 is a perspective view of the cutting elements showing the same disconnected from the body of the trimmer; Fig. 4 is a section taken on the line 4—4 of Fig. 1, omitting the disk; Fig. 5 is a section taken on the line 5—5 of Fig. 4; Fig. 6 is a detail section taken on the line 6—6 of Fig. 2; Fig. 7 is a detail view of the blade; and Fig. 8 is a perspective view of the connected portions of the blade and the blade carrier, partly in section.

In these drawings I have illustrated one embodiment of my invention, but it is to be understood that the trimmer as a whole, as well as the several parts thereof, may take various forms without departing from the spirit of the invention.

In the illustrated form the trimmer comprises an upright frame or body 10 having connected therewith means for imparting forward movement thereto, such a handle 11. A blade carrier 12 is mounted on the body, preferably adjacent to the forward end thereof and extends rearward therefrom to a point adjacent to rear end of the body where it is provided with means for connecting the blade therewith. The blade carrier is so mounted on the body that it may be adjusted in relation thereto and preferably it is pivotally mounted on the body, as by a rivet 13, to permit the vertical adjustment of the blade supporting portion thereof.

Rotatably supported on the blade carrier is a cutting element or disk 14 which is provided with a peripheral series of teeth 15. Each tooth has a sharp point and that edge thereof which is rearmost with relation to the direction of rotation of the disk is approximately, but not quite, radial to the axis of the disk, as shown in 16. The forward edge 17 of each tooth is inclined from the point of that tooth forwardly to the inner end of the rear edge 16 of the next preceding tooth, thus providing a long edge inclined at a broad angle to the abrupt rear edge 16 and which constitutes the cutting edge of the tooth. Thus the rear edge of the lowermost tooth of the disk faces forwardly with relation to the direction of movement of the body and when that tooth is forced into turf, by forward and downward pressure of the body, the engagement of the rear edge of said tooth with the turf will prevent substantial forward movement of the point of the tooth with the body, but the axial portion of the disk will move with the body, thereby causing the disk to rotate and move the several teeth successively to the lowermost turf engaging position as the body moves forwardly.

A blade 18 is rigidly mounted on the rear portion of the blade carrier 12 and extends downwardly and forwardly with relation to the direction of movement of the trimmer as a whole, and the forward end thereof is provided with forwardly converging edge portions 19 and 20 which meet at a sharp point at the forward end of the blade. The lower edge 19 is curved and constitutes a ground engaging surface. The upper edge 20 constitutes the cutting edge of the blade and is inclined with relation to the cutting edge of the lowermost tooth of the disk. The rotation of the disk causes the lowermost tooth as a whole to pivot on the point thereof and to progressively change the angular position of the cutting edge of the tooth with relation to the cutting edge of the blade as the latter moves forwardly with the body. The angularity of the two cutting edges is such that when they are brought into cooperative shearing relation by the relative movement of the blade and the tooth they will be at a very sharp angle one to the other, thus providing a powerful cutting action. Preferably the forward end portion of the blade is bent laterally toward the disk on a line substanially parallel with the cutting edge thereof so that the cutting edge is offset from the body of the blade and has edge contact with the disk.

Disk 14 may be rotatably supported on the blade carrier 12 in any suitable manner. In the present arrangement an elongate member, here shown as a shaft or bolt 21, extends through and is rotatably supported in an opening in the blade carrier 12 and projects laterally beyond the same. Preferably an anti-friction bearing 23 is interclosed between the blade carrier and the head 24 of the bolt or shaft. The disk 14 is mounted on the shaft 21 and rigidly secured thereto in spaced relation to the blade carrier. In the present construction the disk is mounted on a tubular connecting member 25 having at one end thereof a head 26 and having adjacent said head a non-circular portion 27 which extends through a similarly shaped opening in the disk. The disk may be retained in contact with the head 26 in any suitable manner, as by staking the same as shown in 28. The tubular member is provided with an axial screw threaded bore 29 through which the threaded portion of the bolt or shaft extends. An anti-friction bearing 30 is mounted about the shaft and is clamped between the blade carrier and the disk by the rotation of the shaft with relation to the tubular member, the tubular member and the shaft being normally held against relative rotation by a nut 31 on the outer end of the shaft. A plurality of shims 32 are interposed between the bearing 30 and the blade carrier to enable the spacing of the disk 14 with relation to the blade carrier to be varied by removing or inserting one or more shims. The shaft 21 is not connected directly with the body of the trimmer but the head thereof extends through an arcuate slot 33 in the body to permit the movement of the blade carrier about its axis 13.

The offset forward end portion of the blade 18 is in contact with the toothed portion of the disk so as to provide the proper cutting action between the cutting edges of the blade and the disk. The movement of the disk with relation to the blade wears away the contacting surfaces of the blade and of the teeth and thus prevents the same from becoming dull in operation, that is, the cutting edges are self-sharpening. However, the wearing away of these contacting surfaces tends to laterally separate the cutting edges thereof and thus decrease the efficiency of the cutters. In order to maintain the cutting edges in proper relation one to the other they are relatively adjustable. Preferably the disk is axially adjustable with relation to the blade to maintain the toothed portion thereof in proper contact with the blade, and in the present instance this is accomplished by removing one or more of the shims 32 to decrease the distance between the disk and the blade carrier and thus move the disk toward the cutting edge of the blade. The vertical positions of the blade and disk with relation to the body 10 are controlled by the adjustment of the blade carrier 12 about its pivotal axis 13, and the blade carrier is secured in its adjusted position by a bolt 35 which extends through an opening 36 in the blade carrier and through an arcuate slot 37 in the body 10, and is provided on the outer side of the body with a thumb nut 38 by which the adjacent portion of the blade carrier may be clamped tightly against the body. For the purpose of positively locking the blade carrier in adjusted position the body is provided at one or both sides of the slot 37 with inwardly facing recesses 39 and the blade carrier is provided with an outwardly facing projection, or projections 40, adapted to extend into any one of the recesses and to positively be retained therein when the nut 38 has been tightened down. The recesses in the body are, in the present instance, provided by forming a series of corrugations along the edges of the slot 37.

The blade 18 may be mounted on the blade carrier in any suitable manner. In the present instance the blade carrier is provided adjacent the rear end thereof with a transverse, and therefore approximately vertical, arcuate groove or key way 41 adapted to receive a longitudinal arcuate rib or key 42 formed on the blade. The blade carrier is also provided with an opening 43, preferably formed in the key way, to receive a bolt 44 which extends through a slot 45 in the blade, and preferably in the key 42. The rear portion of the blade carrier is bent so that it is inclined slightly to the vertical plane of the disk 14 and the longitudinal movement of the blade with relation to the blade carrier will move the cutting edge of the blade toward or from the disk. Thus the blade may be adjusted transversely to the blade carrier to properly position the cutting edge thereof with relation to the disk, to compensate for wear or otherwise and may then be rigidly secured in adjusted positions by the bolt, and may be adjusted vertically with relation to the body 10 by the movement of the blade carrier about its axis.

If desired the trimmer may be provided with a roller arranged to rest upon and move over the edge portion of a pavement and rotate the disk and guide the same along the edge of a lawn when that edge is spaced slightly from the edge of the pavement. Such a roller is shown in the drawings and comprises a substantially circular cup-shaped body 46, of sheet metal or the like, rigidly secured to the disk 14, and a tread portion or tire 47, preferably formed from a suitable rubber composition. The central portion of the body 46 of the roller is spaced outwardly from the disk 14 and is provided with an opening 48 shaped to fit about the non-circular portion 27 of the tubular member 25 and is secured thereon by the nut 31 on the outer end of the shaft 21. The tread 47 has a flange 49 extending between the inner surface of the body 46 of the roller and the disk 14 and when the nut 31 is tightened down both the body and the tread are tightly clamped to the disk.

While I have shown and described one embodiment of my invention, I wish it to be understood that I do not desire to be limited to the details thereof as various modifications may occur to a person skilled in the art.

Having now fully described my invention, what I claim as new and desire to secure by Letters Patent, is:

1. A lawn trimmer comprising a body, means for imparting forward movement to said body, a blade carrier pivotally mounted on the forward portion of said body and extending rearwardly therefrom, a blade secured to the rear portion of said blade carrier, extending forwardly therefrom and having a cutting edge adjacent the forward end thereof, an elongate member rotatably mounted on said blade carrier and extending laterally beyond the same, a disk secured to said elongate member for rotation therewith and having a peripheral series of teeth provided with cutting edges to cooperate with the cutting edge of said blade, and means for rigidly securing said blade carrier to an intermediate portion of said body in vertically adjusted positions with relation thereto.

2. A lawn trimmer comprising a body, means for imparting forward movement to said body, a blade carrier pivotally mounted on the forward portion of said body and extending rearwardly therefrom, a blade secured to the rear portion of said blade carrier, extending forwardly therefrom and having a cutting edge adjacent the forward end thereof, an elongate member rotatably mounted on said blade carrier and extending laterally beyond the same, a disk secured to said elongate member for rotation therewith and having a peripheral series of teeth provided with cutting edges to cooperate with the cutting edge of said blade, and a roller mounted on said elongate member and rigidly secured to said disk, said roller being of a diameter less than the over-all diameter of said disk.

3. A lawn trimmer comprising a body, means for imparting forward movement to said body, a blade carrier pivotally mounted on the forward portion of said body and extending rearwardly therefrom, a blade secured to the rear portion of said blade carrier, extending forwardly therefrom and having a cutting edge adjacent the forward end thereof, a shaft rotatably mounted on said blade carrier, a disk mounted on said shaft in spaced relation to said blade carrier and having a peripheral series of teeth provided with cutting edges to cooperate with the cutting edge of said blade, means for rigidly securing said disk to said shaft in axially adjusted positions with relation thereto, and an anti-friction bearing interposed between said disk and said blade carrier.

4. A lawn trimmer comprising a body, means for imparting forward movement to said body, a blade carrier pivotally mounted on the forward portion of said body and extending rearwardly therefrom, a blade secured to the rear portion of said blade carrier, extending forwardly therefrom and having a cutting edge adjacent the forward end thereof, a shaft rotatably mounted on said blade carrier, a disk mounted on said shaft in spaced relation to said blade carrier and having a peripheral series of teeth provided with cutting edges to cooperate with the cutting edge of said blade, means for rigidly securing said disk to said shaft in axially adjusted positions with relation thereto, an anti-friction bearing interposed between said disk and said blade carrier, and shims interposed between said blade carrier and said bearing.

5. A lawn trimmer comprising a body, means for imparting forward movement to said body, a blade carrier adjustably mounted on said body, a forwardly extending blade carried by said blade carrier and having a cutting edge adjacent the front end thereof, a shaft rotatably mounted on said blade carrier and extending laterally therefrom, a tubular member mounted on said shaft for adjustment lengthwise thereof and held normally against axial movement with relation thereto, and a disk rigidly secured to said tubular member and having a peripheral series of teeth provided with cutting edges to cooperate with cutting edge of said blade.

6. A lawn trimmer comprising a body, means for imparting forward movement to said body, a blade carrier pivotally mounted on the forward portion of said body and extending rearwardly therefrom, a blade secured to the rear portion of said blade carrier, extending forwardly therefrom and having a cutting edge adjacent the forward end thereof, a shaft rotatably mounted on said blade carrier, a disk mounted on said shaft in spaced relation to said blade carrier and having a peripheral series of teeth provided with cutting edges to cooperate with the cutting edge of said blade, said body having a slot in the rear of the pivotal axis of said blade carrier, and means including a bolt extending through said blade carrier and said slot for securing said blade carrier to said body in vertically adjusted positions with relation to the axis of said disk.

7. A lawn trimmer comprising a body, means for imparting forward movement to said body, a blade carrier pivotally mounted on the forward portion of said body and extending rearwardly therefrom, a blade secured to the rear portion of said blade carrier, extending forwardly therefrom and having a cutting edge adjacent the forward end thereof, a shaft rotatably mounted on said blade carrier, a disk mounted on said shaft in spaced relation to said blade carrier and having a peripheral series of teeth provided with cutting edges to cooperate with the cutting edge of said blade, a roller mounted on said shaft on the outer side of said disk, and means including a nut on said shaft for rigidly securing said disk and said roller one to the other and to said shaft.

HENRY B. WESSENDORF.

REFERENCES CITED

The following references are of record in the file of this patent:

UNITED STATES PATENTS

| Number | Name | Date |
|---|---|---|
| 1,800,166 | Wallen | Apr. 7, 1931 |
| 1,883,817 | Olsen et al | Oct. 18, 1932 |
| 1,970,827 | VanKesteren | Aug. 21, 1934 |
| 2,209,946 | Black | Aug. 6, 1940 |